United States Patent
Gailloux et al.

(10) Patent No.: US 8,683,566 B1
(45) Date of Patent: Mar. 25, 2014

(54) SECURE ACCESS AND ARCHITECTURE FOR VIRTUAL PRIVATE SITES

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 725 days.

(21) Appl. No.: 12/555,581

(22) Filed: Sep. 8, 2009

(51) Int. Cl.
  *G06F 17/30* (2006.01)
  *G06F 21/31* (2013.01)
  *H04L 29/06* (2006.01)

(52) U.S. Cl.
  CPC ............ *G06F 21/31* (2013.01); *H04L 63/0876* (2013.01)
  USPC .................. 726/7; 726/3; 726/4; 726/5; 726/6

(58) Field of Classification Search
  USPC .................... 713/182; 726/1–7, 21, 27, 11, 12
  See application file for complete search history.

(56) References Cited

U.S. PATENT DOCUMENTS

| | | | | |
|---|---|---|---|---|
| 5,875,296 | A * | 2/1999 | Shi et al. ............................ | 726/5 |
| 6,442,693 | B1 * | 8/2002 | Sandgren et al. .................. | 726/4 |
| 7,263,717 | B1 * | 8/2007 | Boydstun et al. .................. | 726/4 |
| 7,664,952 | B2 * | 2/2010 | Eguchi et al. ................. | 713/168 |
| 7,805,372 | B2 * | 9/2010 | Weiss ............................... | 705/51 |
| 8,256,014 | B2 * | 8/2012 | Kori et al. ........................ | 726/29 |
| 8,326,858 | B2 * | 12/2012 | Jenson et al. ................. | 707/766 |
| 8,402,274 | B2 * | 3/2013 | Jun ................................ | 713/170 |
| 8,413,210 | B2 * | 4/2013 | Kuzin et al. ........................ | 726/2 |
| 2002/0099667 | A1 * | 7/2002 | Diamandis et al. .............. | 705/74 |
| 2004/0059941 | A1 * | 3/2004 | Hardman et al. .............. | 713/201 |
| 2005/0273399 | A1 * | 12/2005 | Soma et al. ....................... | 705/26 |
| 2005/0289644 | A1 * | 12/2005 | Wray ................................. | 726/5 |
| 2006/0048211 | A1 * | 3/2006 | Pierson et al. ..................... | 726/3 |
| 2006/0218401 | A1 * | 9/2006 | Jun ............................... | 713/170 |
| 2007/0198532 | A1 * | 8/2007 | Krikorian et al. ............... | 707/10 |
| 2007/0209065 | A1 * | 9/2007 | Branam et al. .................... | 726/5 |
| 2007/0237115 | A1 * | 10/2007 | Bae et al. ....................... | 370/331 |
| 2008/0010336 | A1 * | 1/2008 | Nishizawa et al. ........... | 709/201 |
| 2008/0134307 | A1 * | 6/2008 | Ashkenazi et al. ............... | 726/6 |
| 2008/0154951 | A1 * | 6/2008 | Martinez et al. .......... | 707/103 Y |
| 2008/0307511 | A1 * | 12/2008 | Ahtisaari .......................... | 726/4 |

(Continued)

OTHER PUBLICATIONS

"ImageEvent Support—Share Albums" (Snapshot From Dec. 18, 2008) by ImageEvent; 3 pages; converted to PDF originally from http://imageevent.com/support.jsp?x=5001 via http://archive.org/.*

(Continued)

*Primary Examiner* — Catherine Thiaw

(57) ABSTRACT

A system is provided. The system comprises a computer system and an application that, when executed on the computer system, creates a virtual private site in response to a request from a first portable electronic device, the site storing and displaying electronic content posted by the first device. The application also receives a first message from the first device containing a request to authorize a second portable electronic device to access content from the virtual private site and associates a unique identifier for the second device with a credential for the second device. The system also receives a second message containing a request from the second device to access electronic content from the virtual private site. The system also verifies the unique identifier received in the second message, verifies the credential received in the second message, and transmits the electronic content to the second portable from the virtual private site.

19 Claims, 8 Drawing Sheets

(56) References Cited

U.S. PATENT DOCUMENTS

| | | | |
|---|---|---|---|
| 2009/0044235 A1* | 2/2009 | Davidson | 725/87 |
| 2009/0119306 A1* | 5/2009 | Garbow et al. | 707/10 |
| 2009/0327244 A1* | 12/2009 | Rizal | 707/3 |
| 2009/0327408 A1* | 12/2009 | Nagase et al. | 709/203 |
| 2010/0241711 A1* | 9/2010 | Ansari et al. | 709/205 |
| 2010/0257357 A1* | 10/2010 | McClain | 713/155 |
| 2010/0257593 A1* | 10/2010 | Avelo et al. | 726/4 |
| 2010/0287605 A1* | 11/2010 | Strandell | 726/7 |
| 2011/0055901 A1* | 3/2011 | Karaoguz et al. | 726/4 |
| 2011/0069839 A1* | 3/2011 | Tsuruoka et al. | 380/279 |

OTHER PUBLICATIONS

"Send mass invitations over the phone with Phonevite" (Jul. 26, 2007) by lifehacker; 3 pages; converted to PDF originally from http://lifehacker.com/282910/send-mass-invitations-over-the-phone-with-phonevite.*

R. Gossweiler et al. PLOG: easily create digital pictures stories through cell phone cameras, HP Laboratories, Jan. 2005.*

* cited by examiner

SECURE ACCESS AND ARCHITECTURE FOR VIRTUAL PRIVATE SITES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Weblog sites, social networking sites, and other venues for publishing content on the Internet provide users the opportunity to speak out freely about virtually any subject of their choosing. While much content published on the Internet is of limited interest and may be intended by the posting party for a confined audience, Internet content may be publicly viewable by nearly anyone. Parties publishing text, graphics, and other media may bear responsibility for their content as they would with any action or public expression. An individual criticizing his employer, for instance, in a publicly viewable weblog may face disciplinary action for his remarks, even if the individual attempts to remain anonymous and indicates a desire for his remarks to be private expressions. The interactive nature of weblog communication, the potential for a "no holds barred" tenor of exchange, and the opportunity to express thoughts and feelings almost instantaneously increase the risk of dialogue rapidly elevating in passion and intensity. Participants may express opinions in the heat of argument on a public weblog that they may later regret. Because of the interconnected nature of the Internet, weblog content is also more difficult to control than print or broadcast media, further multiplying the risks of unfettered online expression.

SUMMARY

In an embodiment, a system for secure access and architecture for virtual private sites is provided. The system comprises a computer system and an application, that when executed on the computer system, creates a virtual private site in response to a request from a first portable electronic device, the virtual private site storing and displaying electronic content posted by the first portable electronic device. The system also receives a first message from the first portable electronic device containing a request to authorize a second portable electronic device to access electronic content from the virtual private site and associates a unique identifier for the second portable electronic device with a credential for the second portable electronic device. The system also receives a second message containing a request from the second portable electronic device to access electronic content from the virtual private site. The system also verifies the unique identifier received in the second message, verifies the credential received in the second message, and transmits the electronic content to the second portable electronic device from the virtual private site.

In another embodiment, a processor-implemented method for secure access and architecture for virtual private sites is provided. The method comprises a secure access server receiving a first message from a first portable electronic device, the first message requesting provision of read access to a virtual private site for a second portable electronic device, the first message containing a telephone number associated with the second portable electronic device. The method also comprises the secure access server accessing a database using the telephone number to determine a unique identifier and a credential associated with the second portable electronic device. The method also comprises the secure access server sending a second message to the second portable electronic device containing an invitation to access the virtual private site. The method also comprises the second portable electronic device sending a third message to the secure access server in response to the second message, the third message accepting the invitation and providing a credential to be used in accessing the virtual private site. The method also comprises the secure access server matching the unique identifier with a unique identifier received in the third message. The method also comprises the secure access server creating an account record for the second portable electronic device associating the unique identifier with the credential and associating the second portable electronic device with the virtual private site. The method also comprises the secure access server sending a fourth message to the second portable electronic device notifying the second portable electronic device that the second portable electronic device is authorized to access the virtual private site.

In another embodiment, a processor-implemented method for secure access and architecture for virtual private sites is provided. The method comprises a secure access server receiving a first message from a portable electronic device, the first message providing a credential and seeking to access a virtual private site associated with the secure access server. The method also comprises the secure access server extracting from the first message a unique identifier embedded in the first message, the unique identifier identifying the portable electronic device. The method also comprises the secure access server accessing a database containing account information associated with a plurality of portable electronic devices and locating an account record associated with the unique identifier extracted from the first message. The method also comprises the secure access server determining that a credential associated with the unique identifier in the account record matches the credential provided in the first message. The method also comprises the secure access server sending a second message to the portable electronic device, the second message notifying the portable electronic device that it is cleared to access the virtual private site. The method also comprises the portable electronic device sending a third message to the secure access server containing electronic content for posting to the virtual private site. The method also comprises the secure access server posting the electronic content to the virtual private site.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
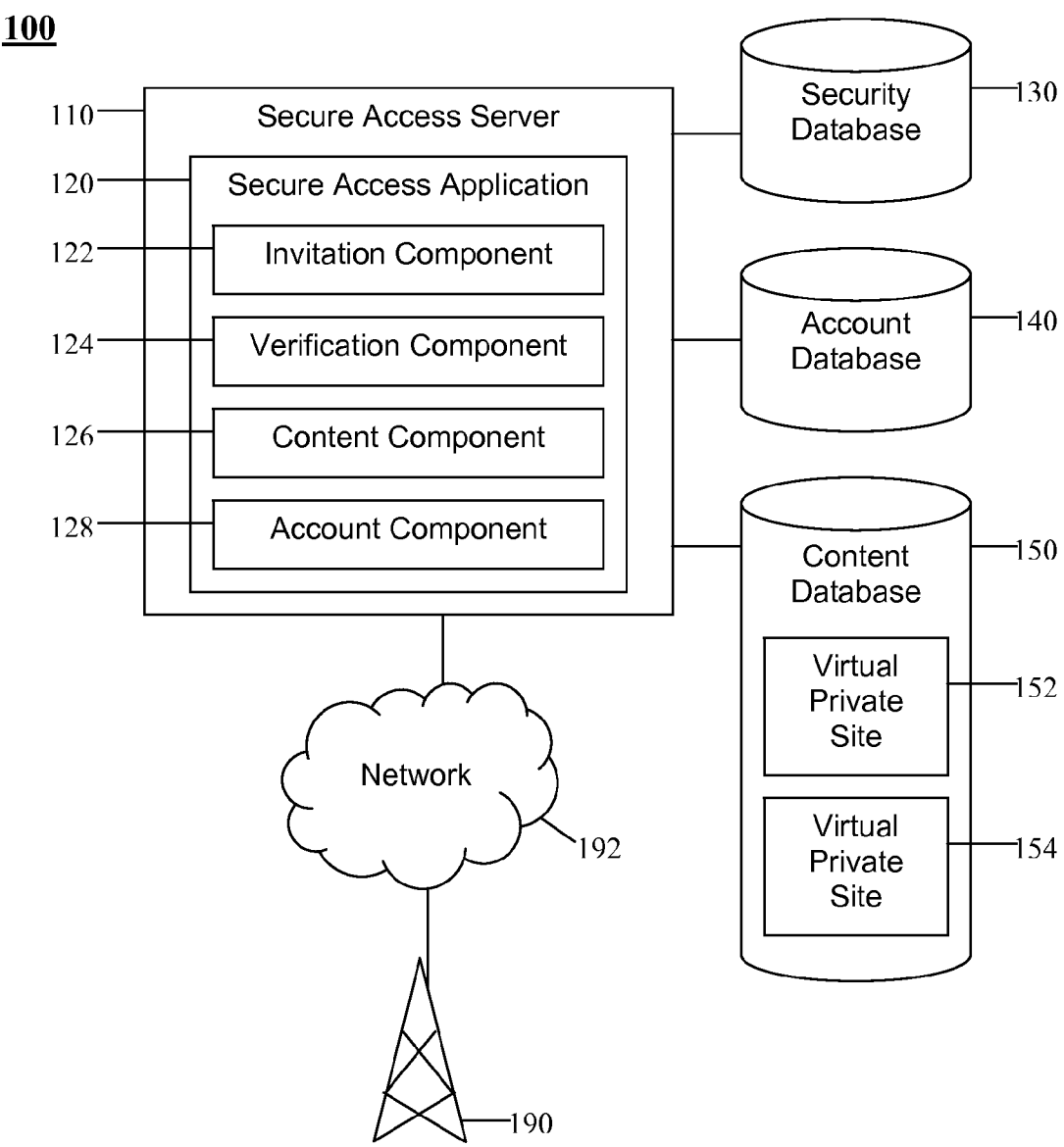
FIG. 1 is a block diagram of a system according to an embodiment of the disclosure.
Figure 1:
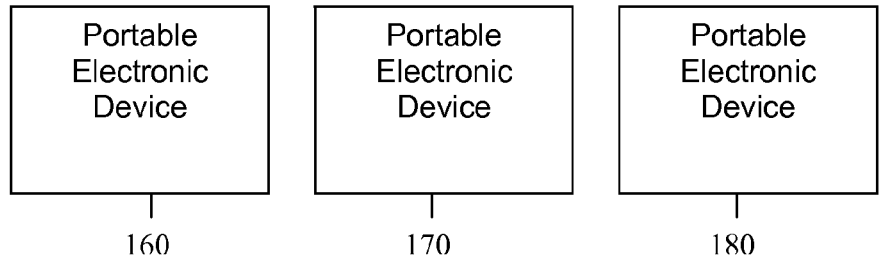

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system for secure access and architecture for virtual private sites promote creation of secure private sites for posting weblog and other electronic content. Access to content is restricted to users employing preregistered portable electronic devices, for example but without limitation a mobile phone, and credentials based on a "have something, know something" security arrangement. Registered portable electronic devices prove their identity by providing a uniquely assigned identifier embedded in each session initiation message that may be authenticated (i.e., the users must "have something," the specific registered portable electronic device). Users must then provide a correct credential (i.e., the users must "know something") or they are not permitted to establish an access session with the secure private site. Initial registration of a device and every attempt to initiate an access session thereafter is authenticated by verifying a uniquely assigned identifier associated with the device and requiring a credential or other authentication code provided by the user. The system enables a founding member to invite only selected additional parties using specific preregistered devices to view existing content. Communities of interest may create customized virtual private sites for the confidential posting of content. Access to the virtual private site is limited to community members using specific devices and credentials associated with the members. Only community members using previously registered portable electronic devices and entering corresponding credentials may view content posted to the virtual private site.

A subscriber to a service hosting virtual private sites creates a community by adding members of the subscriber's choosing. The subscriber may add a new member by furnishing the telephone number of the device to be added to the system. The system locates a unique identifier in its records corresponding to the telephone number. Once the new member has been added, the system verifies each incoming access request from the member by reading the unique identifier contained in each message and comparing it to the unique identifier in its records. Access to the virtual private site is only granted to portable electronic devices that are registered and enter a correct credential. Each time a registered portable electronic device sends a message requesting initiation of an access session, the system matches the unique hardware identifier and credential contained in the message with the same items of information stored in an account database. Every access session is uniquely authorized. An access session may comprise a plurality of accesses, for example as the portable electronic device navigates through the virtual private site, selecting a sequence of links referencing content associated with the virtual private site.

Turning now to FIG. 1, a system 100 for secure access and architecture for virtual private sites is provided. The system 100 comprises a secure access server 110, a secure access application 120, a security database 130, an account database 140, a content database 150, virtual private sites 152, 154, portable electronic devices 160, 170, 180, a base transceiver station 190, and a network 192.

The secure access server 110 may be a computer system. Computer systems are discussed in greater detail hereinafter. The secure access server 110 may comprise one computer or a plurality of computers, for example, a server farm wherein many server computers cooperate to share a processing load. The secure access server 110 may comprise a plurality of computers that are located at different places, for example, to provide geographical diversity and increased service reliability. The secure access server 110 executes one or more applications including the secure access application 120.

The secure access application 120 executes on the secure access server 110 and provides private access to virtual private sites 152, 154 to registered portable electronic devices 160, 170, 180. A user of a portable electronic device 160 subscribing to services offered by a wireless communications provider may request the creation of a virtual private site 152 by the secure access application 120 associated with the provider for the purpose of posting content. The posted content may primarily comprise discussion text about a subject of interest to the user of a portable electronic device 160. The user of the founding portable electronic device 160 may invite friends, family members, colleagues, associates, or others to read content posted by the founding portable electronic device 160. The invited parties may be users of additional portable electronic devices 170, 180. In an embodiment, the invited users of additional portable electronic devices 170, 180 may be provided the ability to contribute their own content to the virtual private site 152 in response to the postings of the founding portable electronic device 160. The users of the portable electronic devices 160, 170, 180, for example, may be members of a church congregation, residents of a community interested in a local issue, or students in a study group. The secure access application 120 creates a virtual private site 152 at the request of the founding portable electronic device 160.

The secure access application 120 permits the founding portable electronic device 160 to specify additional portable electronic devices 170, 180 to invite to access content on the virtual private site 152, for example to view content. The secure access application 120 implements a method of inviting the additional portable electronic devices 170, 180, verifying their identity by matching unique device identifiers, and associating credentials with the unique identifiers. Credentials to be used by additional portable electronic devices 170, 180 when accessing the virtual private site 152 may be initially set by the founding portable electronic device 160 or may be initially set by the additional portable electronic devices 170, 180. In an embodiment, a credential may be at least one of a password, a user identity (userid), a public key certificate, and a biometric user identity comprising at least one of fingerprint, voice recognition, and retinal scan.

A unique identifier associated with the portable electronic device 160, 170, 180 is embedded in each incoming message requesting initiation of an access session from the portable electronic device 160, 170, 180. The secure access application 120 compares the unique identifier and credentials received in each incoming message to begin a session with the unique identifier and credentials in its security database 130 or account database 140 for the sending portable electronic device 160, 170, 180. Every incoming message from a portable electronic device 160, 170, 180 to begin a session is uniquely authenticated in this manner. The embedding of the unique identifier in each message is automatic and is transparent to the user. For example, each message sent by a portable electronic device 160, 170, 180 manufactured to use the code division multiple access (CDMA) contains a unique identifier called a mobile equipment identifier (MEID). A user of a portable electronic device 180 that, for example, was manufactured to use code division multiple access (CDMA) technology, may not normally be aware that each message sent contains the unique identifier in mobile equipment identifier (MEID) format associated uniquely with the portable electronic device 180. The unique identifier is contained in the header or other non-message payload portion of the message.

The secure access application 120 comprises the invitation component 122 that invites and registers portable electronic devices 170, 180 joining a community accessing the virtual private site 152. In an embodiment, the virtual private site 152 is created when a founding or originating portable electronic device 160 engages a wireless service provider or other provider of communications services hosting the secure access application 120 and arranges for creation of the virtual private site 152. In an embodiment, the portable electronic device 160 as the party establishing the virtual private site 152 has the sole authority to invite additional portable electronic devices 170, 180 to access content on the virtual private site 152. Once the secure access application 120 has established the virtual private site 152 at the request of the founding portable electronic device 160, the portable electronic device 160 may begin inviting additional portable electronic devices 170, 180 to join.

The portable electronic device 160 may invite additional portable electronic devices 170, 180 by providing the telephone numbers of the additional portable electronic devices 170, 180 to the secure access application 120. The invitation component 122 searches the security database 130 that contains telephone numbers and corresponding unique identifiers for portable electronic devices 160, 170, 180. The security database 130 may contain information for only portable electronic devices 160, 170, 180 subscribing to wireless services offered by the wireless communications services provider hosting the virtual private site 152. In the event that the founding portable electronic device 160 invites additional portable electronic devices 170, 180 that subscribe to wireless services offered by a wireless service provider other than the wireless service provider used by the portable electronic device 160, the secure access server 110 hosting the invitation component 122 may access information sources associated with the other wireless service provider to access the needed unique identifier and other information.

A unique identifier is a unique string of characters assigned to each portable electronic device 160, 170, 180 ever manufactured. Because portable electronic devices 160, 170, 180 may use different technologies, unique identifiers may be expressed in a variety of formats. For example, portable electronic devices 160, 170, 180 manufactured to use the code division multiple access (CDMA) technology receive a unique identifier called a mobile equipment identifier (MEID). The unique identifier for portable electronic devices 160, 170, 180 manufactured with the global system for mobile communications (GSM) or universal mobile telecommunications system (UMTS) technologies is called an international mobile subscriber identity (IMSI). Portable electronic devices 160, 170, 180 manufactured using the integrated digital enhanced network (iDEN) technology receive a unique identifier called an international mobile equipment identity (IMEI). In the cases described using these technologies, the unique identifiers are associated with the hardware of the portable electronic devices 160, 170, 180 and the unique identifiers do not normally change. In an embodiment, some portable electronic devices 160, 170, 180 are assigned unique identifiers by the wireless service providers selling the portable electronic devices 160, 170, 180 and for purposes of the discussion of the present disclosure, these assigned unique identifiers are recognized and used by the components of the system 100. Unique identifiers are typically provided in origination messages to establish voice and/or data calls and/or sessions.

The invitation component 122 searches the security database 130 to locate the unique identifier associated with the telephone number for each additional portable electronic device 170 invited by the founding portable electronic device 160. The invitation component 122 may also find a credential associated with the additional portable electronic device 170. Having linked the telephone number of the invited portable electronic device 170 with its unique identifier in the security database 130, the invitation component 122 then sends a message to the additional portable electronic device 170 announcing the invitation by the founding portable electronic device 160. The message may be an electronic mail message, short message service (SMS), or other message and the message may contain information about the virtual private site 152 and information about the founding portable electronic device 160. The message also may contain instructions to the portable electronic device 170 to use in replying and joining if it so elects.

The portable electronic device 170 may indicate its acceptance of the invitation of the founding portable electronic device 160 to access the virtual private site 152 by replying to the message from the invitation component 122. Embedded in the reply message is the unique identifier assigned to the portable electronic device 170 either when it was manufactured or by the wireless service provider with which the portable electronic device 170 is associated. The reply message from the portable electronic device 170 accepting the invitation also may contain the credential associated with the portable electronic device 170. The invitation component 122 receives the reply message from the portable electronic device 170 and extracts the unique identifier from the reply message. The invitation component 122 compares it with the unique identifier found earlier in the security database 130 associated with the telephone number provided by the founding portable electronic device 160. If the two unique identifiers match, the invitation component 122 establishes an account for the portable electronic device 170, links the portable electronic device 170 to the virtual private site 152, and provides the portable electronic device 170 the requested access.

The linking of the telephone number of the portable electronic device 170 to a unique identifier in the security database 130 followed by the matching of the unique identifier with the unique identifier embedded in the invitation acceptance message and the passing of the credential are the three fundamental steps toward authenticating the portable electronic device 170 for access to the virtual private site 152. The invitation component 122 also links the credential provided by the portable electronic device 170 to the newly established account for the portable electronic device 170 and the virtual private site 152. The invitation component 122 finally notifies the founding portable electronic device 160 that its invitation of the portable electronic device 170 was accepted and the portable electronic device 170 is now registered to access the virtual private site 152.

The secure access application 120 also comprises the verification component 124 that is active when portable electronic devices 160, 170, 180 that have received authorization begin sending messages to access the virtual private site 152. Each time an authorized portable electronic device 160, 170, 180 seeks to access the virtual private site 152 to view, listen to, or otherwise consume already stored content or post new content, the verification component 124 receives the incoming message from the portable electronic device 160, 170, 180 and verifies that the sender has been previously subjected to the initial authorization process by the invitation component 122 and is currently authorized to access the virtual private site 152. The verification component 124 receives the incoming message and extracts from the message the embedded unique identifier associated with the sending portable electronic device 160, 170, 180. The verification component 124 may compare the unique identifier extracted from the message with the unique identifier in the security database 130 in a similar manner as previously done by the invitation component 122 when the portable electronic device 170 was initially authorized.

The verification component 124 may alternately or in addition compare the unique identifier extracted from the incoming message with a unique identifier inserted into an account record established for the portable electronic device 160, 170, 180 when it was originally authorized by the invitation component 122. The verification component 124 will also request the credential from the portable electronic device 160, 170, 180 requesting access and will match the received credential with the credential in its account record in the security database 130 or elsewhere associated with the sender. With each access of the virtual private site 152 by a portable electronic device 160, 170, 180, the verification component 124 completes the unique authentication process of comparing unique identifier and credential received with the information in the security database 130 or other secure record before permitting access to the virtual private site 152.

The secure access application 120 also comprises the content component 126 that posts newly received content to the virtual private site 152, enables reading and other viewing of stored content, and otherwise manages existing content stored on the virtual private site 152. Content posted to the virtual private site 152 may comprise text files, graphic files, motion picture files, and audio files. The content component 126 may contain intelligence or logic enabling it to arrange content on the virtual private site 152 in accordance with instructions from the portable electronic device 160 or in accordance with direction from the secure access application 120 that hosts the virtual private site 152 and is ultimately in control of the virtual private site 152. The content component 126 may scan incoming content for viruses and may apply logic to delete content entirely or archive aging content in offline storage media. The activities of the content component 126 may depend in part on the nature of the content being posted, the overall purpose and objectives of the portable electronic devices 160, 170, 180 authorized to post to the virtual private site 152, and the type of site or private space that is the virtual private site 152, for example a weblog site or a social networking site.

While the content component 126 is a software component of the secure access application 120, the nature and structure of the content component 126 may depend on the type of software and hardware media that together make up the virtual private site 152. If, for example, the content associated with the virtual private site 152 resides on a database, such as the content database 150, the content component 126 may in part promote database queries and supporting files used to extract information from the content database 150. If the virtual private site 152 is not in database format and instead resides in ordinary server storage locally or on a distributed network, the content component 126 may be in part a file requester that accesses data in a hierarchical or other file structure.

The secure access application 120 may comprise the account component 128 that establishes and manages account relationships on behalf of a wireless service provider that may host a plurality of virtual private sites 152, 154. In an embodiment, a plurality of portable electronic devices 160, 170, 180 may subscribe to services provided by a wireless service provider. The provider may establish virtual private sites 152, 154 at the request of portable electronic devices 160, 170, 180 on a commercial basis. In an embodiment, a wireless service provider may establish a virtual private site 152 on a prepaid basis wherein the provider receives funds in advance from a founding portable electronic device 160. The provider may create a prepaid account associated with the virtual private site 152 and charge the account each time the virtual private site 152 is accessed or each time some other service is performed. In a contrasting embodiment, the provider may invoice the founding portable electronic device 160 for services performed during a preceding time period. The account component 128 manages account relationships of communities of portable electronic devices 160, 170, 180 and may provide reporting to communities or the founding portable electronic device 160 at various times. Information about individual portable electronic devices 160, 170, 180, their associations with communities that have access to virtual private sites 152, 154, and the communities themselves may be stored in the account database 140 or in other media. As with the content component 126, the nature and structure of the account component 128 may depend partly on the type of software and hardware media in which account information is stored.

In an embodiment, a wireless service provider hosting virtual private sites 152, 154 and offering services described herein could charge a one-time flat fee or a monthly flat fee to a founding portable electronic device 160 to establish a virtual private site 152. The wireless service provider could alternatively establish the virtual private site 152 without charge to the founding portable electronic device 160 and then charge visiting portable electronic devices 160, 170, 180 for access on a per use basis, on a daily or monthly basis, or on some other basis. The wireless service provider could allow an organization to sponsor a virtual private site 152 and permit access to organization members using pre-paid portable electronic devices 160, 170, 180, potentially pre-paid portable electronic devices 160, 170, 180 provided by the wireless service provider. The organization members using the pre-paid portable electronic devices 160, 170, 180 could then access the virtual private site 152 without charge or with a charge that is reversed and charged to the sponsoring organization. The organization would then receive a monthly total charge, a monthly charge per user, a charge per access, or a charge determined on another basis. The founding portable electronic device 160 in these embodiments is able to provide a private community with low cost and/or fixed cost access. The wireless service provider in the embodiments benefits from organization members possibly carrying the provider's pre-paid portable electronic devices 160, 170, 180 that the organization members may likely also be using for other services offered by the provider unrelated to the present disclosure that would generate other additional revenue for the provider.

The security database 130 is associated with the secure access server 110 and stores associations of unique identifiers, telephone numbers, and credentials for portable electronic devices 160, 170, 180. The security database 130 may contain other information unrelated to the present disclosure such as home addresses of customers, account numbers, and account settings. The security database 130 may perform other functions unrelated to the system 100.

The account database 140 is associated with the secure access server 110 and stores account information about individual portable electronic devices 160, 170, 180, their associations with communities that have access to virtual private sites 152, 154, and the communities themselves. In an embodiment, information about portable electronic devices 160, 170, 180 may be copied from the security database 130 to a secure area of the account database 140 and the account and security information there may be consulted by the verification component 124. This may be done to reduce the processing load on the security database 130. Because the security database 130 may be a primary source of security and account information for a wireless service provider for a variety of purposes, the security database 130 may be heavily accessed by other functions of a wireless service provider unrelated to the system 100. Repeated accesses by components of the secure access application 120 may place excessive processing load on the security database 130. It may be advisable to regularly replicate information from the security database 130 to the account database 140 and arrange for the verification component 124 to authenticate incoming access requests by primarily consulting the account database 140.

The content database 150 is associated with the secure access server 110 and hosts virtual private sites 152, 154. The content database 150 may be one database or a collection of databases with information in virtual private sites 152, 154 distributed across the databases.

Virtual private sites 152, 154 display and store a plurality of confidential content posted by portable electronic devices 160, 170, 180. A virtual private site 152 is a collection of computer files and folders protected by permissions and other security measures. A virtual private site 152 may be a conventional web site that hosts text, graphic, audio, and other electronic content that members of a community associated with the virtual private site 152 may post for viewing and listening. A virtual private site 152 may be a weblog or "blog" site wherein members of a community post text commentary discussing matters of interest to the community. A virtual private site 152 may host instant messaging content wherein members post brief messages to each other in a rapid dialogue format. A virtual private site 152 may be a social networking site wherein members post content comprising one or more of the media types discussed.

The present disclosure teaches the use of secure access to virtual private sites 152, 154 for selected and authenticated portable electronic devices 160, 170, 180 in a variety of embodiments. A small community of employees of a company or other organization may wish to communicate with each other privately outside of work hours in a virtual setting wherein they may have a reasonable expectation that their discussion will remain confidential. A standard weblog or blog may provide such individuals a venue for discussion but with little guarantee of confidentiality. Standard blog content posted on the internet is visible to nearly anyone. The present disclosure teaches limiting admission to a community accessing a virtual private site 152 to a small number of portable electronic devices 160, 170, 180 using only preregistered unique identifiers and also providing credentials. Embodiments of the present disclosure may be used by small church communities or congregations, study groups of students, small community groups focused on one or a few distinct issues, or emergency service providers that exchange confidential and sensitive information in crisis situations wherein conversations must be secure.

In an embodiment, virtual private sites 152, 154 may not be hosted on the content database 150 and the information posted on the virtual private sites 152, 154 may not be in database format. In an embodiment, a virtual private site 152 may be hosted by the file system of a file server such as the secure access server 110 or in a separate physical data storage unit located on the network 192 and accessible by the secure access server 110.

Portable electronic devices 160, 170, 180 view and post electronic content to virtual private sites 152, 154 in confidential arrangements enabled by components of the system 100. Portable electronic devices 160, 170, 180 may be a mobile telephone, a personal digital assistant (PDA), a media player, or other portable device with the capability to transmit at least one of text, voice, other audio, graphic, and motion picture files. In an embodiment, the portable electronic device 160 may be referred to as the first portable electronic device 160 and the portable electronic device 170 may be referred to as the second portable electronic device 170

The base transceiver station 190 may be any of cellular wireless base stations, for example a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; or other wireless access devices.

While only a single base transceiver station 190 is depicted in FIG. 1 and each of the portable electronic devices 160, 170, 180 is depicted as transmitting and receiving signals from the network 192 through the single base transceiver station 190, in an embodiment a plurality of base transceiver stations 190 may be in existence and accessed by the portable electronic devices 160, 170, 180 as they communicate and move between coverage areas of different base transceiver stations 190.

The network 192 promotes communication between the components of the system 100. The network 192 may be any communication network including a public data network (PDN), a public switched telephone network (PSTN), a private network, and/or a combination thereof.

Figure 2A:
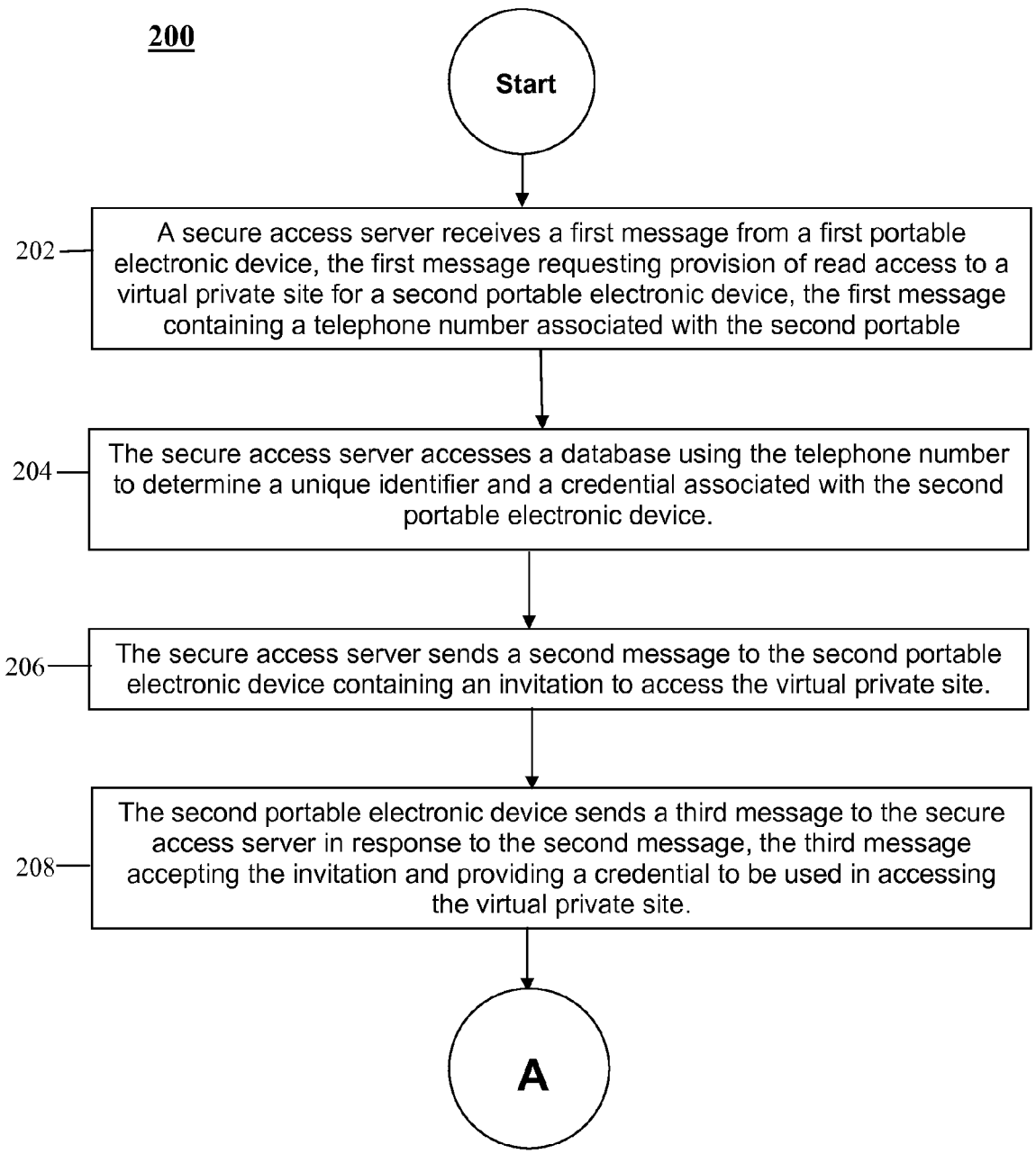
FIG. 2a and FIG. 2b are flow charts illustrating a method according to an embodiment of the disclosure.
Figure 2B:
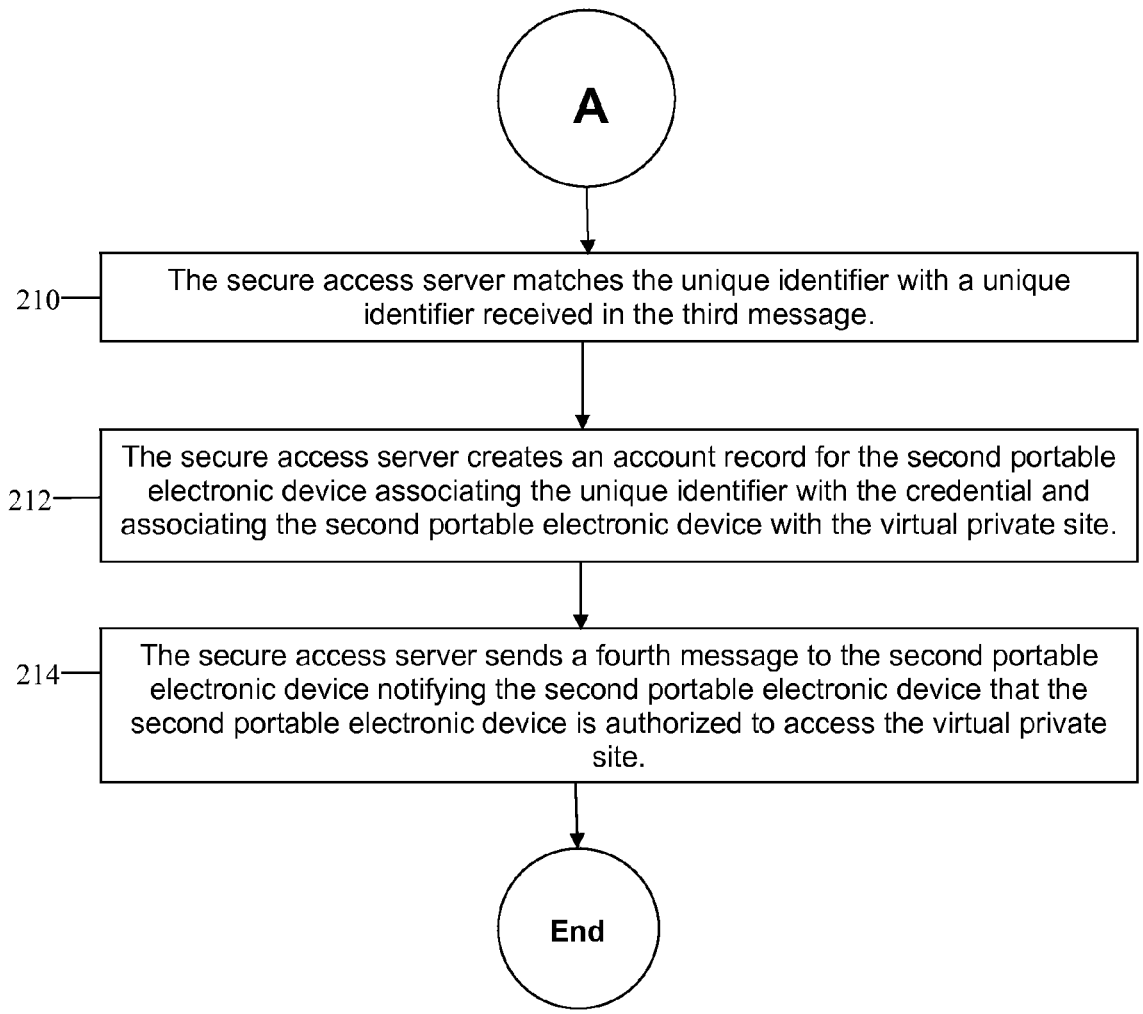

Turning now to FIG. 2a and FIG. 2b, a method 200 for secure access and architecture for virtual private sites is provided. Beginning at block 202, the secure access server 110 receives a first message from a first portable electronic device 160, the first message requesting the secure access server 110 to provide read access to a virtual private site 152 for a second portable electronic device 170. In an embodiment, the first portable electronic device 160 is the founder of a community that will be accessing the virtual private site 152 for viewing and posting of confidential electronic content. As the founder, the first portable electronic device 160 may be the only portable electronic device 160, 170, 180 with the authority to add additional portable electronic devices 170, 180. Portable electronic devices 170, 180 added to the community may have full right to view and post any content they wish or they may alternatively have only read access, but they may not add members. One embodiment of the present disclosure addresses the placement of authority to add new members in only one member, a policy that may provide greater control and security.

Prior to the actions at block 202, the first portable electronic device 160 will have arranged with the secure access server 110 to establish the virtual private site 152. The first portable electronic device 160 may have made arrangements about the size and time duration, if any, of the virtual private site 152 and the types of content that may be posted to the virtual private site 152. The first portable electronic device 160 may have specified that it is to be the only portable electronic device 160, 170, 180 with the authority to invite additional portable electronic devices 170, 180 to join the community to access the virtual private site 152.

Continuing at block 202, when the first portable electronic device 160 sends the first message to the secure access server 110 requesting the secure access server 110 to provide access to the second portable electronic device 170, the first portable electronic device 160 may provide only the telephone number of the second portable electronic device 170. That may be the only information that the secure access server 110 needs to locate the second portable electronic device 170 in its records. Needing to provide only the telephone number of the second portable electronic device 170 may provide convenience to the first portable electronic device 160.

At block 204, the secure access server 110 accesses the security database 130 using the telephone number of the second portable electronic device 170. The secure access server 110 uses the telephone number to locate the record of the second portable electronic device 170 that contains information including the unique identifier associated with the second portable electronic device 170. In an embodiment, if the first portable electronic device 160 and the second portable electronic device 170 do not use the same wireless service provider, the secure access server 110 contacted by the first portable electronic device 160 may not be able to locate a record of the second portable electronic device 170 in the security database 130. In an embodiment, in this case, arrangements may be made with the wireless service provider used by the second portable electronic device 170 to access the necessary information.

At block 206, the secure access server 110 sends a second message to the second portable electronic device 170 inviting the second portable electronic device 170 to join the community founded by the first portable electronic device 160. The second message may describe the type of content to be posted on the virtual private site 152 and may provide other information, for example the initial cost of joining or the cost of posting individual items of content to the virtual private site 152.

At block 208, the second portable electronic device 170 sends a third message to the secure access server 110 in response to the second message. In the third message, the second portable electronic device 170 indicates its acceptance of the invitation to join the community founded by the first portable electronic device 160 and provides a credential that it intends to use or was instructed to use when accessing the virtual private site 152. In an embodiment, the credential to be used by the second portable electronic device 170 may have been provided to the second portable electronic device 170 by the first portable electronic device 160. The first portable electronic device 160 will have advised the secure access server 110 at block 202 of the credential that the second portable electronic device 170 will be using along with the telephone number of the second portable electronic device 170 when the first portable electronic device 160 initially notified the secure access server 110 in the first message of its intention to add the second portable electronic device 170 to the community.

At block 210, the secure access server 110 matches the unique identifier it generated from the security database at block 202 with a unique identifier contained in the third message. Messages sent by portable electronic devices 160, 170, 180 contain the unique identifier of the sending device embedded in the messages. The secure access server 110 is able to extract the unique identifier from the third message and compare it with the unique identifier it generated from the security database 130 at block 204. When the two unique identifiers match, the secure access server 110 authenticates the second portable electronic device 170 as a new member of the community authorized to access the virtual private site 152. If the two unique identifiers do not match, the secure access server 110 may send a rejection message to the second portable electronic device 170. The secure access server 110 may, for additional security, also match the credential contained in the third message with the credential contained in the information generated from the security database 130 at block 204.

At block 212, the secure access server 110 creates an account record for the second portable electronic device 170 that associates the unique identifier with the credential provided by the second portable electronic device 170. This is the account record that the verification component 124 of the secure access application 120 will reference each time it receives incoming messages from the second portable electronic device 170 requesting access to the virtual private site 152. The account record created for the second portable electronic device 170 at block 212 may be stored in the security database 130 with a copy in the account database 140 with the information replicated between the two at regular intervals. At block 212, the secure access server 110 also associates the second portable electronic device 170 with the virtual private site 152 in the account record.

At block 214, the secure access server 110 sends a fourth message to the second portable electronic device 170 advising the second portable electronic device 170 that it is now authorized to access the virtual private site 152.

Figure 3A:
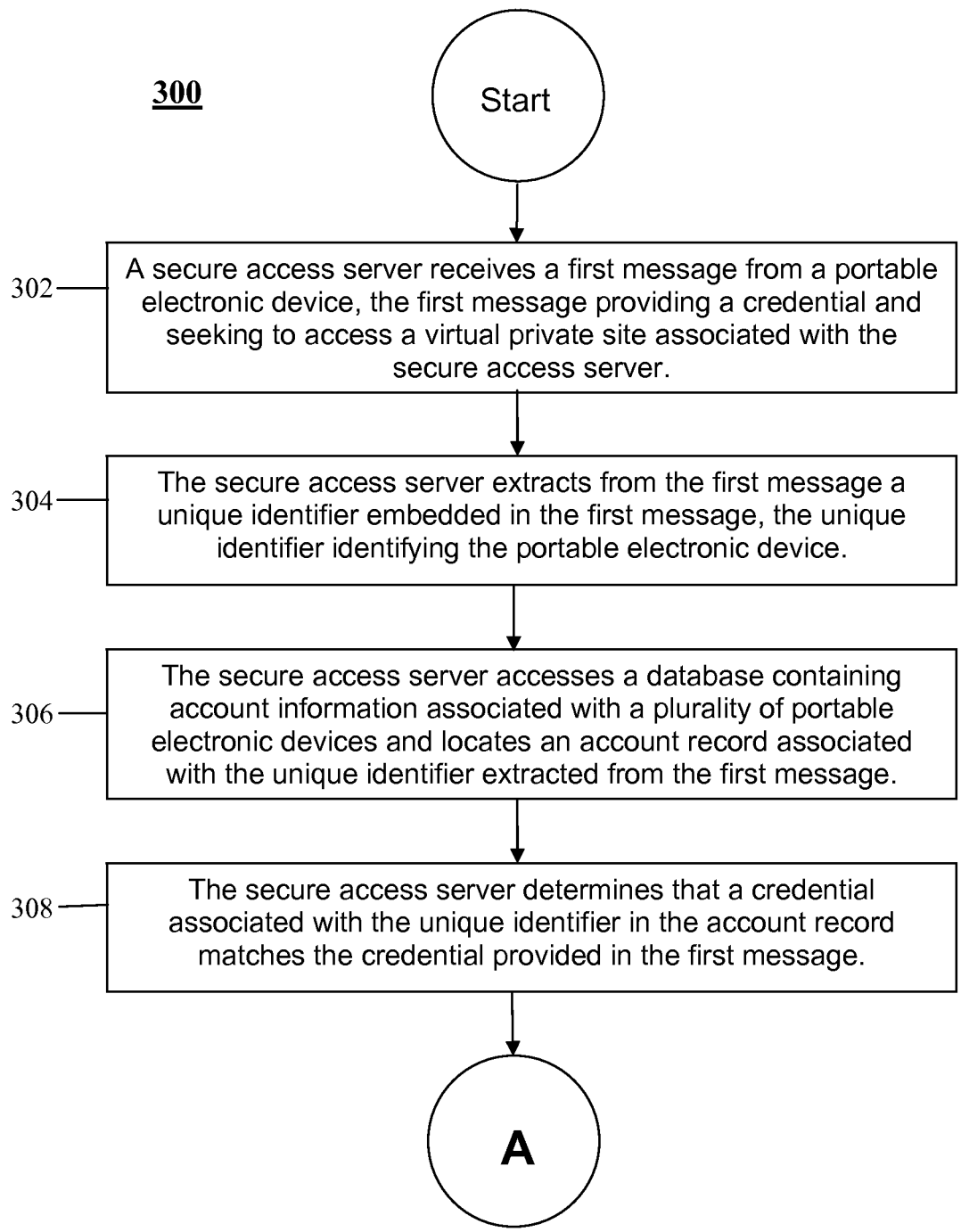
FIG. 3a and FIG. 3b are flow charts illustrating another method according to an embodiment of the disclosure.
Figure 3B:
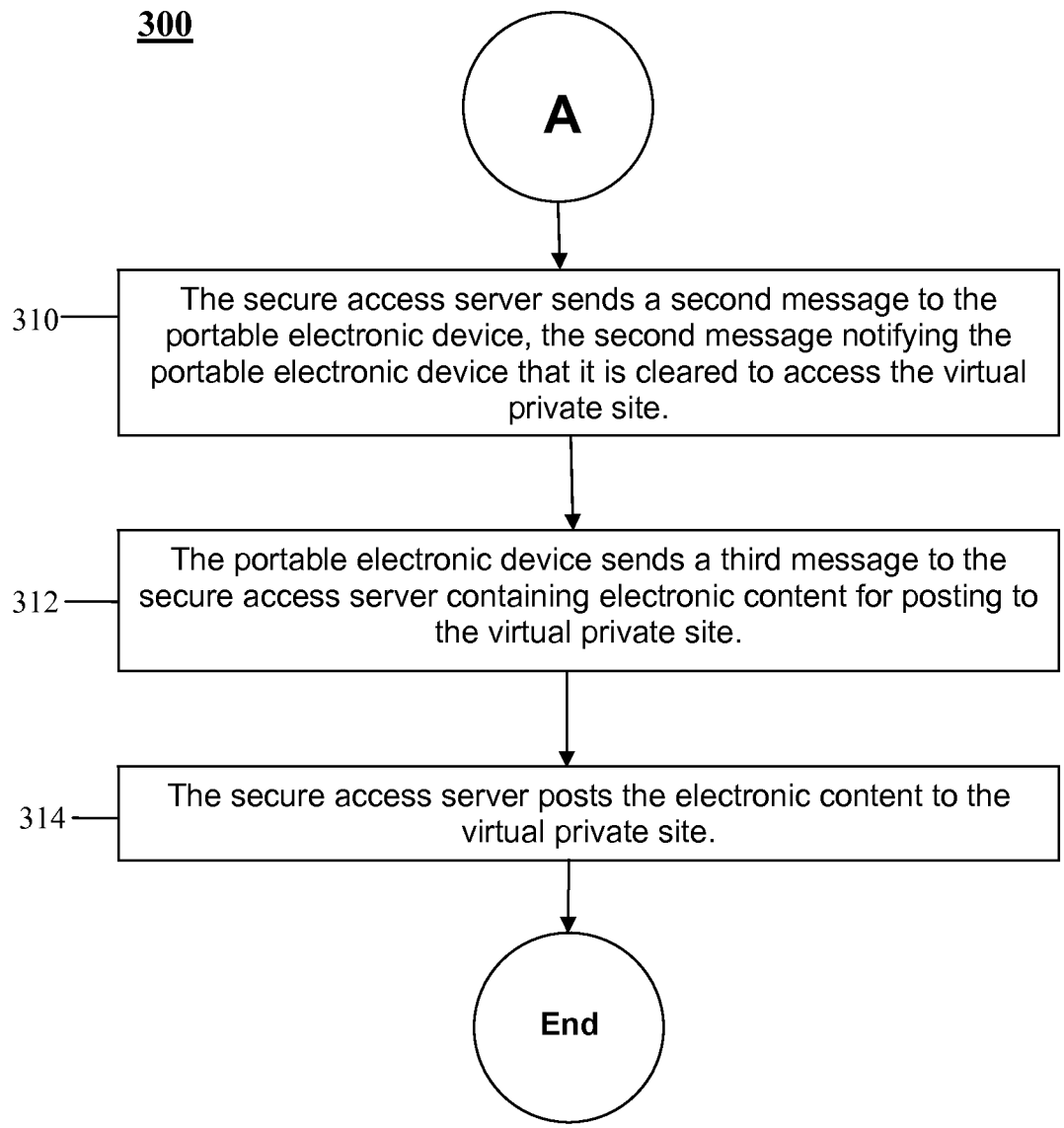

Turning now to FIG. 3a and FIG. 3b, a method 300 for secure access and architecture for virtual private sites is provided. Beginning at block 302, the secure access server 110 receives a first message from the portable electronic device 170, the first message providing a credential and seeking access to the virtual private site 152 associated with the secure access server 110. Prior to the actions at block 302, the portable electronic device 170 will have been invited and admitted to a community with authorization to access the virtual private site 152. In the method 300, the portable electronic device 170 may be attempting to make a routine access of the virtual private site 152.

At block 304, the secure access server 110 extracts from the first message a unique identifier embedded in the message. The unique identifier identifies the portable electronic device 170. In an embodiment, the unique identifier may be permanently associated with the hardware of the portable electronic device 170, for example in the case of the mobile equipment identifier (MEID) associated with portable electronic devices manufactured to use the code division multiple access (CDMA) technology. In another embodiment, the unique identifier may be assigned by the wireless service provider that provides wireless services accessed by the portable electronic device 170. The unique identifier may be a billing account number (BAN) used by the wireless service provider for the service provided the portable electronic device 170.

At block 306, the secure access server 110 accesses the security database 130 or the account database 140 that contains account information about a plurality of portable electronic devices 160, 170, 180. The secure access server 110 locates the account record for the portable electronic device 170 by using the unique identifier extracted from the first message.

At block 308, the secure access server 110 matches the credential received in the first message with the credential contained in the account record located at block 306. At block 310, the secure access server 110 sends a second message to the portable electronic device 170 notifying the portable electronic device 170 that it may access the virtual private site 152.

At block 312, the portable electronic device 170 sends a third message to the secure access server 110 containing electronic content to be posted to the virtual private site 152. At block 314, the secure access server 110 posts the content to the virtual private site 152.

An embodiment of the present disclosure addresses the coupling of unique identities attaching to each of the portable electronic devices 160, 170, 180 and the credentials provided when the portable electronic devices 160, 170, 180 were registered as described in the method 200. This may be understood to be a "have something, know something" security paradigm, where the "have something" is provided by physical possession of a registered portable electronic device 160, 170, 180 and the "know something" is provided by the credentials input by a user to the portable electronic device 160, 170, 180. In the event a user that has previously used a portable electronic device 170 associated with a particular credential contacts the secure access server 110 to access a virtual private site 152, provides his or her correct credential, but is using a device other than the portable electronic device 170, for example the portable electronic device 160 or the portable electronic device 180, the secure access server 110 will not permit access.

In the event a portable electronic device 160 that has been registered with a credential to access a virtual private site 152 must be replaced, the replacement device, for example the portable electronic device 170 or the portable electronic device 180, must be linked with the credential in a manner similar to that described in the method 200 for newly added devices. The full process of authentication may be necessary to associate the unique identifier of the replacement unit with the existing credential.

When two or more portable electronic devices 160, 170, 180 exchange electronic content via a virtual private site 152, the electronic content remains stored in the secure access server 110, content database 150, or other destination. Content exchanged between portable electronic devices 160, 170, 180 using the components of the secure access server 110 is viewable by but not stored on portable electronic devices 160, 170, 180. This policy may protect the security of content in the event a portable electronic device 160, 170, 180 is misplaced, lost, or stolen.

Figure 4:
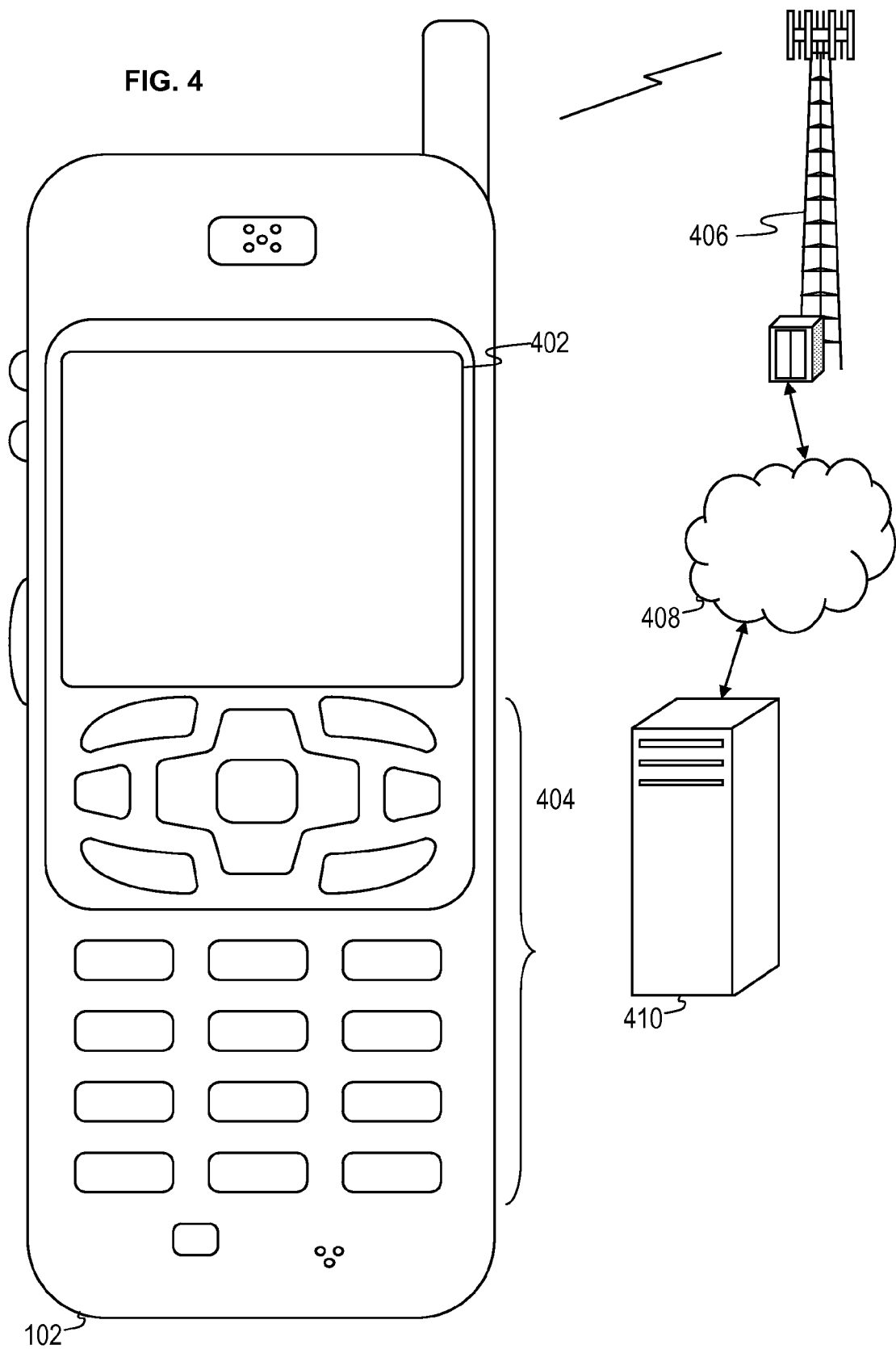
FIG. 4 is an illustration of a portable electronic device according to an embodiment of the disclosure.

FIG. 4 shows a wireless communications system including the portable electronic device 102. FIG. 4 depicts the portable electronic device 102, which is operable for implementing aspects of the present disclosure, but the present disclosure should not be limited to these implementations. Though illustrated as a mobile phone, the portable electronic device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the portable electronic device 102 is not a general purpose computing device like a portable, laptop or tablet computer, but rather is a special-purpose communications device such as a mobile phone, wireless handset, pager, or PDA. The portable electronic device 102 may support specialized activities such as gaming, inventory control, job control, and/or task management functions, and so on.

The portable electronic device 102 includes a display 402 and a touch-sensitive surface or keys 404 for input by a user. The portable electronic device 102 may present options for the user to select, controls for the user to actuate, and/or cursors or other indicators for the user to direct. The portable electronic device 102 may further accept data entry from the user, including numbers to dial or various parameter values for configuring the operation of the handset. The portable electronic device 102 may further execute one or more software or firmware applications in response to user commands. These applications may configure the portable electronic device 102 to perform various customized functions in response to user interaction. Additionally, the portable electronic device 102 may be programmed and/or configured over-the-air, for example from a wireless base station, a wireless access point, or a peer portable electronic device 102.

The portable electronic device 102 may execute a web browser application which enables the display 402 to show a web page. The web page may be obtained via wireless communications with a base transceiver station (BTS) 406, a wireless network access node, a peer portable electronic device 102 or any other wireless communication network or system. While a single base transceiver station 406 is illustrated, it is understood that the wireless communication system may comprise additional base transceiver stations. In some instances, the portable electronic device 102 may be in communication with multiple base transceiver stations 406 at the same time. The base transceiver station 406 (or wireless network access node) is coupled to a wired network 408, such as the Internet. Via the wireless link and the wired network, the portable electronic device 102 has access to information on various servers, such as a server 410. The server 410 may provide content that may be shown on the display 402. Alternately, the portable electronic device 102 may access the base transceiver station 406 through a peer portable electronic device 102 acting as an intermediary, in a relay type or hop type of connection.

Figure 5:
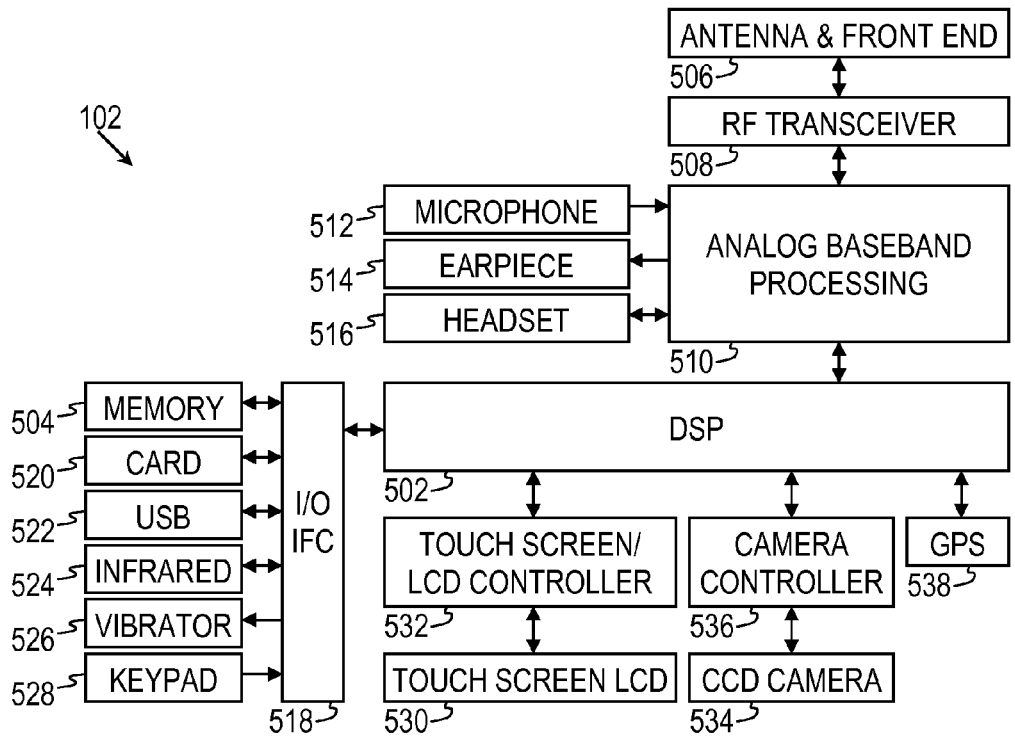
FIG. 5 is a block diagram of a portable electronic device according to an embodiment of the disclosure.

FIG. 5 shows a block diagram of a possible embodiment of the portable electronic device 102. While a variety of known components of the portable electronic device 102 are depicted, in an embodiment a subset of the listed components and/or additional components not listed may be included in the portable electronic device 102. The portable electronic device 102 includes a digital signal processor (DSP) 502 and a memory 504. As shown, the portable electronic device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 102 to send and receive information from a radio access network (RAN) or some other available wireless communications network or from a peer portable electronic device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the portable electronic device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 102 to function as a peripheral device to exchange information with a personal computer or other computer system. The infrared port 524 and other optional ports such as a Bluetooth interface or an IEEE 802.11 compliant wireless interface may enable the portable electronic device 102 to communicate wirelessly with other nearby handsets and/or wireless base stations.

The input/output interface 518 may further connect the DSP 502 to the vibrator 526 that, when triggered, causes the portable electronic device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the portable electronic device 102. Another input mechanism may be the touch screen LCD 530, which may also display text and/or graphics to the user. The touch screen LCD controller 532 couples the DSP 502 to the touch screen LCD 530.

The CCD camera 534 enables the portable electronic device 102 to take digital pictures. The DSP 502 communicates with the CCD camera 534 via the camera controller 536. The GPS sensor 538 is coupled to the DSP 502 to decode global positioning system signals, thereby enabling the portable electronic device 102 to determine its position. In another embodiment, a camera operating according to a technology other than charge coupled device cameras may be employed. Various other peripherals may also be included to provide additional functions, e.g., radio and television reception.

Figure 6:
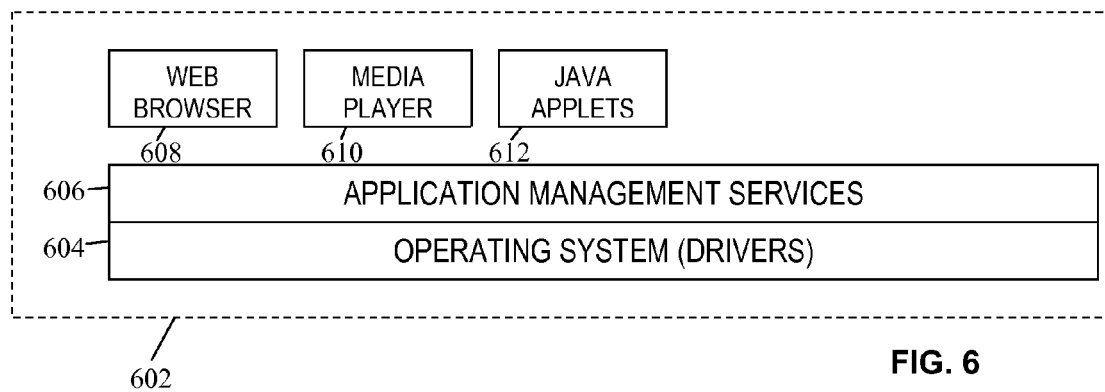
FIG. 6 is a block diagram of a software configuration for a portable electronic device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the portable electronic device 102. Also shown in FIG. 6 are a web browser application 608, a media player application 610, and JAVA applets 612. The web browser application 608 configures the portable electronic device 102 to operate as a web browser, allowing a user to enter information into forms and select links to retrieve and view web pages. The media player application 610 configures the portable electronic device 102 to retrieve and play audio or audiovisual media. The JAVA applets 612 configure the portable electronic device 102 to provide games, utilities, and other functionality.

Figure 7:
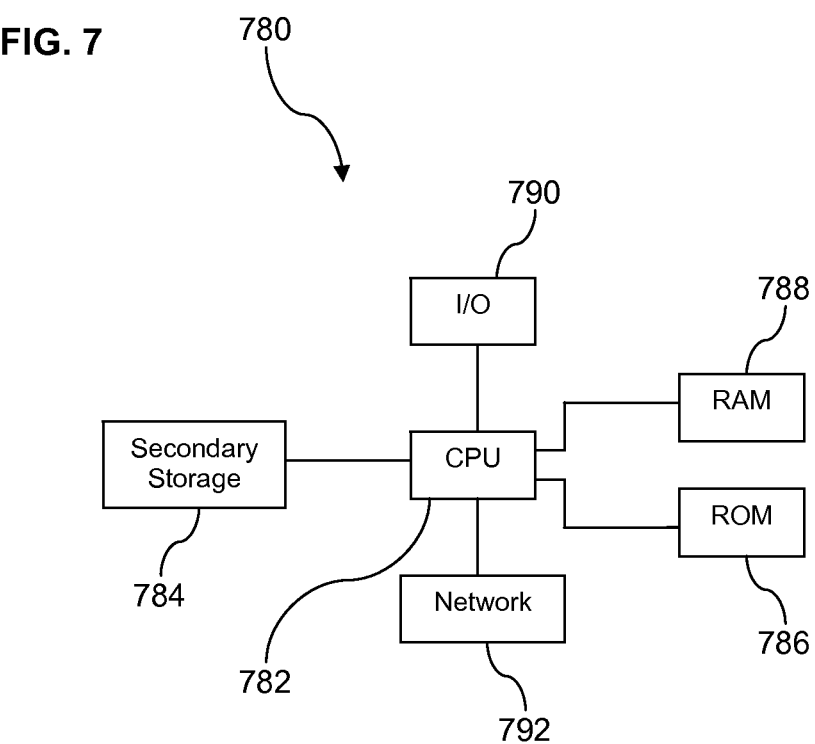
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for secure access and architecture for virtual private sites, comprising:
   a computer system;
   an account database associated with one or more virtual private sites; and
   an application, that when executed on the computer system,
      creates a virtual private site in response to a request from a first portable electronic device, the virtual private site storing and displaying a first electronic content posted by the first portable electronic device, wherein the first portable electronic device is separate from the computer system;
      receives an authorization request message from the first portable electronic device containing a request to authorize a second portable electronic device to access the virtual private site storing and displaying the first electronic content, wherein the second portable electronic device is separate from the computer system, and wherein the request to authorize the second portable electronic device comprises a telephone number associated with the second portable electronic device;
      accesses a security database comprising telephone numbers which correspond to a plurality of unique identifiers and one or more credentials associated with each unique identifier of the plurality of unique identifiers, wherein the security database is a primary source of security and account information for a wireless service provider;
      associates a unique identifier of the plurality of unique identifiers with the telephone number associated with the second portable electronic device and identifies at least one credential based on the unique identifier, wherein the unique identifier and the at least one credential are associated with an access right to the virtual private site;
      copies the telephone number, the unique identifier, and the at least one credential to the account database;
      receives an access request message at the computer system containing a request from the second portable electronic device to access the virtual private site storing and displaying the first electronic content, wherein the access request message comprises the unique identifier and the at least one credential;
      accesses the account database;
      verifies that the unique identifier and the at least one credential received in the access request message matches the corresponding unique identifier and the corresponding at least one credential in the account database;
      transmits, in response to verifying the unique identifier and the at least one credential received in the access request message, the first electronic content from the virtual private site to the second portable electronic device; and
      receives and posts, in response to verifying the unique identifier and the at least one credential received in the access request message and to obtaining authorization from the first portable electronic device, a second electronic content from the second portable electronic device to the virtual private site, wherein the first electronic content and the second electronic content are each one of a text file, a graphics file, a motion picture file, or an audio file.

2. The system of claim 1, wherein the virtual private site comprises files stored on at least one of the computer system, a storage media associated with the computer system, and a database associated with the computer system.

3. The system of claim 1, wherein the electronic content from the virtual private site is accessible only by the first portable electronic device and the second portable electronic device, and wherein the unique identifier for the second portable electronic device is a unique hardware identifier associated with only the second portable electronic device.

4. The system of claim 1, wherein the unique identifier is associated with the second portable electronic device by the wireless service provider providing wireless communications services to the second portable electronic device.

5. The system of claim 1, wherein the at least one credential is at least one of a password, a user identity (userid), a public key certificate, and a biometric user identity comprising at least one of fingerprint, voice recognition, and retinal scan.

6. The system of claim 1, wherein the application rejects a request from a third portable electronic device to authorize a fourth portable electronic device to access electronic content from the virtual private site.

7. The system of claim 1, wherein the application requires the second portable electronic device to furnish its unique identifier and previously registered credential each time the second portable electronic device establishes an access session to the virtual private site.

8. A processor-implemented method for secure access and architecture for virtual private sites, comprising:

receiving, by a secure access server, a request message from a first portable electronic device, the request message requesting authorization of read access to a virtual private site of one or more virtual privates sites for a second portable electronic device, the request message containing a telephone number associated with the second portable electronic device, wherein the first portable electronic device and the second portable electronic device are separate from the secure access server;

accessing, by the secure access server, a security database and using the telephone number to determine a unique identifier and a credential associated with the second portable electronic device, wherein the security database is a primary source of security and account information for a provider of wireless communications services, and wherein the unique identifier and the credential are associated with an access right to the virtual private site;

copying, by the secure access server, the telephone number associated with the second portable electronic device, the unique identifier, and the credential from the security database to an account database associated with the one or more virtual private sites;

sending, by the secure access server, an invitation message to the second portable electronic device containing an invitation to access the virtual private site;

receiving, by the secure access server, an acceptance message from the second portable electronic device in response to the invitation message, the acceptance message accepting the invitation and providing the unique identifier for the second portable electronic device and the credential to be used in accessing the virtual private site;

accessing, by the secure access server, the account database;

matching, by the secure access server, the unique identifier copied to the account database with the unique identifier received in the acceptance message;

creating, by the secure access server, an account record for the second portable electronic device associating the unique identifier with the credential and associating the second portable electronic device with the virtual private site in response to correctly matching the determined unique identifier copied to the account database with the unique identifier received in the acceptance message;

sending, by the secure access server, a notification message to the second portable electronic device notifying the second portable electronic device that the second portable electronic device is authorized to access the virtual private site;

receiving, by the secure access server, an authorization message from the second portable electronic device in response to the notification message, the authorization message requesting authorization for the second portable electronic device to post and display electronic content on the virtual private site;

verifying, by the secure access server, that the second portable device is authorized to post and display the electronic content on the virtual private site;

authorizing, by the secure access server, the second portable electronic device to post and display the electronic content on the virtual private site; and receiving and posting, by the secure access server, the electronic content from the second portable electronic device to the virtual private site in response to the authorizing, wherein the electronic content is one of a text file, a graphics file, a motion picture file, or an audio file.

9. The method of claim 8, wherein the secure access server is associated with the provider of wireless communications services.

10. The method of claim 8, wherein the unique identifier is determined by the provider of wireless communications.

11. The method of claim 8, wherein the unique identifier is one of a mobile equipment identifier (MEID), an international mobile subscriber identity (IMSI), and an international mobile equipment identity (IMEI).

12. The method of claim 8, further including when the unique identifier provided in the acceptance message does not match the unique identifier associated with the telephone number provided in the request message, sending a rejection message to the second portable electronic device.

13. The method of claim 8, wherein the first portable electronic device is the originating member of a community of associated portable electronic devices accessing the virtual private site and makes the selection of the second portable electronic device and additional portable electronic devices to join the community.

14. The method of claim 8, wherein the virtual private site is associated with one of a fraternal organization, a community group, an academic study group, and a religious congregation.

15. A processor-implemented method for secure access and architecture for virtual private sites, comprising:

receiving, by a secure access server, a request message from a portable electronic device, the request message providing a credential and a unique identifier embedded in the request message, and seeking to access a virtual private site associated with the secure access server, wherein the unique identifier and the credential are associated with an access right to the virtual private site;

extracting, by the secure access server, from the request message the unique identifier embedded in the request message, the unique identifier identifying the portable electronic device;

accessing, by the secure access server, an account database containing account information associated with a plurality of portable electronic devices authorized by an administrator of the virtual private site to access the virtual private site and locating an account record in the account database associated with the unique identifier extracted from the request message, wherein the account database is associated with at least the virtual private site of one or more virtual private sites, wherein the account information was previously copied from a security database in response to the administrator of the virtual private site authorizing the portable electronic device, and wherein the security database provides a primary source of security and account information for a wireless service provider;

determining, by the secure access server, that a credential associated with the unique identifier in the account record matches the credential provided in the request message;

sending, by the secure access server, a notification message to the portable electronic device in response to determining that the credential associated with the unique identifier in the account record matches the credential provided in the request message, the notification message notifying the portable electronic device that it is cleared to access the virtual private site;

receiving, by the secure access server, a content message from the portable electronic device containing electronic content for posting to the virtual private site in response to the notification message;

determining, by the secure access server, that authorization has been provided to the portable electronic device to post the electronic content to the virtual private site; and posting, by the secure access server, the electronic content to the virtual private site in response to the content message and in response to determining that authorization has been provided to the portable electronic device to post the electronic content to the virtual private site, wherein the electronic content is one of a text file, a graphics file, a motion picture file, or an audio file.

16. The method of claim 15, further comprising denying, by the secure access server, a portable electronic device access to the virtual private site when a message requesting access provides a previously registered credential but the message is originated from a portable electronic device not registered with the previously registered credential.

17. The method of claim 15, further comprising requiring, by the secure access server, a new linking of credential and portable electronic device when a portable electronic device previously registered with a credential is exchanged for a new portable electronic device.

18. The method of claim 15, wherein the virtual private site stores all electronic content exchanged by portable electronic devices accessing the virtual private site.

19. The method of claim 15, wherein the portable electronic device is one of a mobile telephone or a personal digital assistant (PDA).

* * * * *